United States Patent
Sajeepa et al.

(10) Patent No.: US 9,548,890 B2
(45) Date of Patent: Jan. 17, 2017

(54) FLEXIBLE REMOTE DIRECT MEMORY ACCESS RESOURCE CONFIGURATION IN A NETWORK ENVIRONMENT

(71) Applicant: CISCO TECHNOLOGY, INC., San Jose, CA (US)

(72) Inventors: Prabhath Sajeepa, San Jose, CA (US); Veerababu Arja, Sunnyvale, CA (US); Sagar Borikar, San Jose, CA (US); Rushikesh Shree Khasgiwale, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 355 days.

(21) Appl. No.: 14/216,414

(22) Filed: Mar. 17, 2014

(65) Prior Publication Data

US 2015/0263887 A1    Sep. 17, 2015

(51) Int. Cl.
*H04L 12/24* (2006.01)
*H04L 12/925* (2013.01)

(52) U.S. Cl.
CPC ......... *H04L 41/0803* (2013.01); *H04L 47/722* (2013.01)

(58) Field of Classification Search
CPC ............... H04L 47/772; H04L 41/0803; H04L 67/1097; G06F 3/061; G06F 3/0688; G06F 12/0868; G06F 13/28
See application file for complete search history.

(56) References Cited

U.S. PATENT DOCUMENTS

| | | | |
|---|---|---|---|
| 2008/0126509 A1* | 5/2008 | Subramanian | H04L 47/10 709/214 |
| 2013/0067468 A1 | 3/2013 | Tiller et al. | |
| 2013/0083690 A1 | 4/2013 | Cardona et al. | |
| 2013/0198312 A1* | 8/2013 | Tamir | G06F 15/167 709/212 |
| 2013/0254424 A1 | 9/2013 | Guay et al. | |
| 2013/0275631 A1 | 10/2013 | Magro et al. | |
| 2014/0052808 A1* | 2/2014 | Krishnan | H04L 67/40 709/212 |

OTHER PUBLICATIONS

Hilland, et al., "RDMA Protocol Verbs Specification," Internet-Draft, draft-hilland-rddp-verbs-00.txt, Apr. 25, 2003, 227 pages; http://tools.ietf.org/html/draft-hilland-rddp-verbs-00.

* cited by examiner

*Primary Examiner* — Kim T Nguyen
(74) *Attorney, Agent, or Firm* — Patent Capital Group (57) ABSTRACT

An example method for flexible remote direct memory access resource configuration in a network environment is provided and includes determining whether sufficient remote direct memory access (RDMA) resources are available in a network environment to satisfy a request for RDMA resources, inserting the requested RDMA resources into a network profile, associating the network profile with a network interface endpoint in the network, and communicating the network profile over the network to a virtual interface card (VIC) adapter that processes RDMA packets, the VIC adapter configuring the requested RDMA resources in the VIC adapter's hardware and the requested RDMA resources being mapped to a host memory for use by the network interface endpoint. In specific embodiments, the VIC adapter allocates and identifies a region in local memory for managing the requested RDMA resources and reserved for the network interface endpoint.

20 Claims, 9 Drawing Sheets

FLEXIBLE REMOTE DIRECT MEMORY ACCESS RESOURCE CONFIGURATION IN A NETWORK ENVIRONMENT

TECHNICAL FIELD

This disclosure relates in general to the field of communications and, more particularly, to flexible remote direct memory access (RDMA) resource configuration in a network environment.

BACKGROUND

A typical enterprise network, which can include data centers, contains myriad network elements, including hosts, load balancers, routers, switches, etc. The network connecting the network elements provides secure user access to various services and an infrastructure for deployment, interconnection, and aggregation of shared resource as required, including applications, hosts, appliances, and storage. Improving operational efficiency and optimizing utilization of resources in such networks are some of the challenges facing network operators. Network operators want a resilient infrastructure that consistently supports diverse applications and services and protects the applications and services against disruptions. The application workloads deployed in a typical datacenter can have varying level of latency and bandwidth requirements, which have to be supported by the network infrastructure. A properly planned and operating network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for flexible remote direct memory access resource configuration in a network environment is provided and includes determining whether sufficient remote direct memory access (RDMA) resources are available in a network environment to satisfy a request for RDMA resources, inserting the requested RDMA resources into a network profile, associating the network profile with a network interface endpoint in the network, and communicating the network profile over the network to a virtual interface card (VIC) adapter that processes RDMA packets, the VIC adapter configuring the requested RDMA resources in the VIC adapter's hardware and the requested RDMA resources being mapped to a host memory for use by the network interface endpoint.

As used herein, the term "network profile" can include a software definition of a workload, including workload placement, application specific security definitions (e.g., virtual local area network (VLAN) mappings), instances of application deployment (e.g., application requirements such as appropriate firewall policies between relevant application tiers, application descriptions, application locations, etc.), and connectivity between hosts and application tiers. The network profile can include a port profile, which comprises properties and settings to configure a virtual interface, and/or a service profile, which comprises a software definition of a server (including a physical or virtual server), which may include its storage and network characteristics and configuration settings.

Example Embodiments

Figure 1:
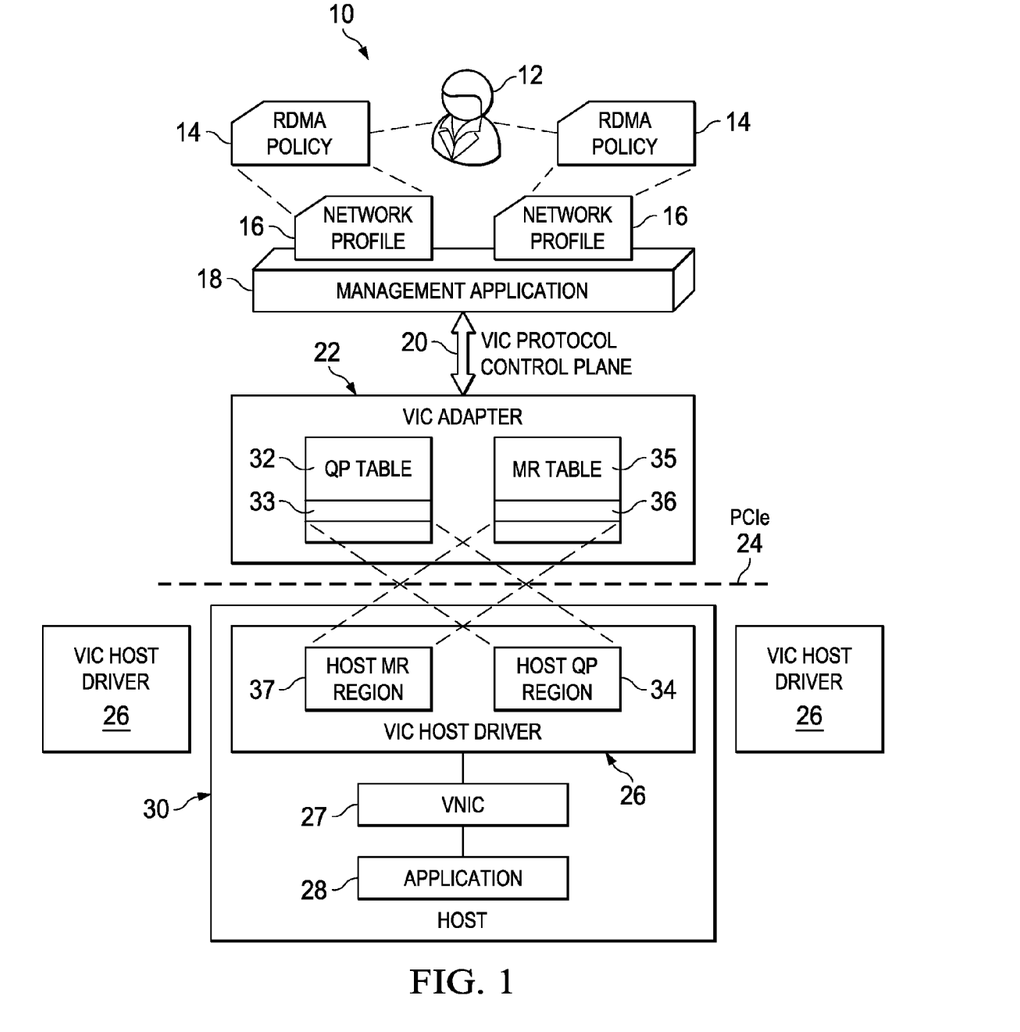
FIG. 1 is a simplified block diagram illustrating a communication system for flexible remote direct memory access resource configuration in a network environment.

Turning to FIG. 1, FIG. 1 is a simplified block diagram illustrating a communication system 10 for flexible remote direct memory access resource configuration in a network environment in accordance with one example embodiment. A user 12 may generate one or more RDMA policy 14. RDMA policy 14 may be inserted, or incorporated into, or otherwise made part of one or more network profile 16. A management application 18 may communicate network profile 16 through a virtual interface card (VIC) protocol control plane 20 to at least one VIC adapter 22. A Peripheral Component Interconnect Express (PCIe) bus 24 may facilitate communication between VIC adapter 22 and one or more VIC host driver 26. VIC adapter 22 may create a virtual Network Interface Card (VNIC) 27 that can be associated with a specific VIC host driver 26 and an application 28 executing in a host 30. In various embodiments, host 30 can comprise a physical server, or a virtual machine (VM).

Each VIC host driver 26 may comprise an RDMA engine for managing RDMA related operations. In various embodiments, VIC adapter 22 may provision a queue pair (QP) table 32, comprising at least one VNIC QP region 33, which may map to a host QP region 34 in one of VIC host driver 26. VIC adapter 22 may provision a memory region (MR) table 35 and at least one VNIC MR region 36, which may map to a host MR region 37 in one of VIC host driver 26. Host QP region 34 and host MR region 37 may be used by VNIC 27 during RDMA network communication on behalf of application 28.

Embodiments of communication system 10 can facilitate a policy based RDMA resource management. The policies (e.g., RDMA policy 14) can be created to specify RDMA resources to be used based on various criteria, including workloads. As used herein, the term "RDMA resource" is meant to encompass hardware resources (e.g., number of hardware queues, such as QPs, amount of memory region space, etc.) that may be used for communication using RDMA. Examples of RDMA resources include number of QPs and MRs used in RDMA communication. User 12 can associate RDMA policy 14 to network interface endpoints (e.g., VNIC 27) on bare metal servers or VMs uniformly through network profile 16. RDMA policy 14 associated with a particular VM (e.g., host 30) or application (e.g., 28) may be carried as part of live migration (e.g., of the VM).

Embodiments of communication system 10 can provide a flexible way to re-configure a fixed set of RDMA resources (e.g., QPs and MRs) across substantially all RDMA capable network interface endpoints (e.g., represented by plurality of VIC host driver 26) on a particular server. Various embodiments of communication system 10 can facilitate an elegant mechanism for a host RDMA software component to discover RDMA resources (e.g., QPs and MRs) provisioned for a given network interface (e.g., VNIC 27). In various embodiments, the RDMA resources may be changed dynamically by user 12. When network profile 16 is deployed to a particular host 30, management application 18 may configure host 30, VIC adapter 22, fabric extenders, fabric interconnects, and other network elements to match the configuration settings specified in network profile 16.

Communication system 10 may include a network infrastructure that unites computing, network, and storage access in a scalable, multi-chassis platform, in which network and storage resources are integrated into a unified management domain, managed centrally by management application 18 (e.g., executing in a fabric interconnect). A suitable interface, such as a Command Line Interface (CLI) or Graphical User Interface (GUI), may be presented to user 12 (e.g., system administrator, network operator, etc.) for creating and managing RDMA policy 14 and associating RDMA policy 14 with applicable applications, hosts, interfaces, and other network components. In many embodiments, management application 18 may provide a unified, embedded management of software and hardware components in communication system 10 across multiple chassis, rack servers, and virtual machines.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

The VIC adapter is a PCIe based Converged Network Adapter (CNA) deployed on certain blade and rack servers in a network environment. The VIC adapter provides high speed (e.g., 10G/40G) input/output (I/O) interfaces (e.g., VNICs) for network and storage traffic. The VIC adapters can enable RDMA functionality by supporting packet classification and dynamic modification of packet headers. The VIC adapter has packet processors that can execute micro code routines at ingress/egress for substantially every packet. The micro code routines perform various RDMA functions, such as DMA of ingress data directly into host memory based on a virtual address mentioned in a packet header, inserting/deleting RDMA transport and link layer headers and performing packet checks for sequence number and Cyclic Redundancy Check (CRC).

RDMA is a mechanism for moving buffers (e.g., a temporary storage location for data in a memory element while the data is being transferred) between two applications across a network. RDMA is typically implemented on a host channel adapter (HCA), which comprises a network interface card that executes an RDMA engine. RDMA may also be implemented on the VIC adapters that include the RDMA engine (e.g., in VIC host drivers). The adapter (e.g., HCA, VIC adapter) creates a channel from the RDMA engine though the PCIe bus to the application memory. RDMA uses queue pairs (QPs) on the adapters for sending and receiving data. The QPs are generally adapter wide resources and are maintained in the adapter's memory. Note that the QPs are not hardware I/O queues; rather, they are software entities created by RDMA software running on the host (e.g., device that executes the application using the RDMA mechanism), for example, as part of VIC host drivers. The QPs created by the RDMA software are accessible by the packet processors in the adapter during traffic flow without intervention of the RDMA software. For this reason, the software managed QPs are maintained in adapter memory which are accessible by the packet processors. To permit the application to access the QPs, the QP message buffers are mapped into each application's virtual address space, providing the application with direct access to the messaging service without intervention by the host computer system's operating system. An identifier called a QP number can identify a specific QP.

RDMA operations start by pinning memory (e.g., function supplied by the host's operating system that forces the MR to be resident in physical memory and keeps the virtual-to-physical address translations constant from the adapter's point of view), which involves informing the host's kernel that a specific portion of user (e.g., virtual) memory is owned by the application (e.g., that uses the memory). The specific portion of the memory, referred to as the MR, may be registered with the adapter, using an identifier, user address, length of the region and access permissions (read/write). MR comprises an area of memory that an application wants the adapter to be able to (locally or locally and remotely) access directly in a logically contiguous fashion. The MR is typically identified by an identifier (MR key) and other parameters. The adapter uses the identifier, user address, length of the region and access permissions to address the memory and prepare a channel from the adapter to the memory. Thus, MRs are RDMA resources that represent regions of virtual machine memory used in DMA. The MRs are created by RDMA consumers (e.g., applications) on the host (e.g., server), and accessed by the adapter. During I/O transfers, the packet processors in the adapter will look up the MRs to determine the user DMA address and check if read/write is permitted to the MRs.

Consider the following data transfer example using RDMA, where data in a buffer of memory system A is moved to another buffer in a different memory system B (e.g., located remotely in another part of the network). System A and B create respective QPs and register corresponding MRs in memory. System A identifies the buffer to be moved to System B. System B has an empty buffer allocated for the data to be received. System B creates a work queue (e.g., receive queue). The work queue contains a pointer to the memory buffer where the data will be placed once it arrives. System A also creates another work queue (e.g., send queue) that points to the buffer in its memory to be transmitted. The send queue at System A and receive queue at System B together form a particular QP. The adapter at system A consumes the send queue and streams the data from the memory region to system B. The adapter at System B consumes the receive queue to learn where it should place the data. The data streams over a high speed channel bypassing the kernel of the hosts.

Because the RDMA resources (QPs and MRs) are maintained in adapter memory, the total number of QPs and MRs that can be created is fixed by the hardware resources of the adapter. The number of QPs and MRs is based on free memory available on the adapter. Modern adapters (e.g., VIC adapters) provide capability to create as many as 256 VNICs for a particular host. It may not be prudent to distribute the RDMA resources uniformly across all the VNICs created on a host because workload requirements may vary across the VNICs and may not justify uniform resource allocation. (Workload refers to the amount of processing that the computer has been asked to do at a given time. The workload can consists of some amount of application program executing in the computer and some number of users connected to and interacting with the computer's applications.) Thus, there is a need for flexible resource allocation scheme where the user can decide the number of QPs and MRs based on the workload that is going to be deployed on that network interface endpoint.

In some scenarios, such as service provider deployments, the tenants decide the workloads to be run on virtual machines provisioned by the service provider. The service provider may charge the tenants based on the hardware/resources consumed. If workloads running on the virtual machines (VMs) require RDMA service, the tenants may want to be charged based on the specific RDMA resources requested. Current mechanisms do not provide for provisioning RDMA resources based on flexible workloads.

Communication system 10 is configured to address these issues (and others) in offering a system and method for flexible remote direct memory access resource configuration in a network environment. According to an embodiment of communication system 10, management application 18 may determine whether sufficient RDMA resources are available in a network environment to satisfy a request for RDMA resources (e.g., through RDMA policy 14 from user 12). Management application 18 may insert (e.g., associate, configure, add, etc.) the requested RDMA resources into network profile 16, and associate network profile 16 with a network interface endpoint (e.g., VNIC 27) in the network. Management application 18 may communicate network profile 16 over the network to VIC adapter 22 that processes RDMA packets. VIC adapter 22 may configure the requested RDMA resources in VIC adapter 22's hardware (e.g., memory element, for example, in VNIC QP region 33 in QP table 32, and VNIC MR region 36 in MR table 35). The requested RDMA resources may be mapped to a host memory (e.g., host QP region 34 and host MR region 37) for use by the network interface endpoint (e.g., VNIC 27).

Instantiation and configuration of network interface devices on a server (e.g., VM, such as host 30) are performed using templates and policies by management application 18. RDMA policy 14 configured by user 12 may specify the RDMA resources (e.g., number of QPs and MRs) provisioned in communication system 10. In various embodiments, user 12 may specify the number of QP and MR resources as part of RDMA policy 14. RDMA policy 14 can be associated with a specific network interface end point (e.g., VNIC 27) on host 30. The RDMA resource count can be configured based any suitable consideration (e.g., type of workload planned for a given compute element.) For example, a server message block (SMB) file server may require a large number of QP and MRs, as compared to an SMB client. Embodiments of communication system 10 may provide flexibility for user 12 to manage multiple VNICs with varying number of RDMA resources. Management application 18 in collaboration with VIC adapter 22 may ensure that the user configuration does not exceed a total number of RDMA resources that can be configured on VIC adapter 22.

During operation, user 12 may create RDMA policy 14 and specify therein the number of QPs and MRs for a particular workload (e.g., application 28). Management application 18 may validate the user request, for example, determining whether sufficient RDMA resources are available in the network (e.g., in any one or more of VIC adapters in the network) to satisfy the request for RDMA resources. RDMA policy 14 can be statically associated with a network interface endpoint (e.g., VNIC 27) in embodiments where RDMA policy 14 is applied to bare-metal servers. In some embodiments, RDMA policy 14 may be grouped with other network policies (e.g., QoS policy, VLAN policy) and maintained as network profile 16. Network profile 16 may be associated dynamically with network interface endpoints (e.g., VNIC 27) on VMs (e.g., host 30). Management application 18 may pass the information about the requested RDMA resources to VIC adapter 22 as part of network device creation on the bare-metal servers.

During power up, VIC adapter 22 may allocate QP table 32 and MR table 35 in its local memory for managing the QPs and MRs, respectively of the requested RDMA resources. VIC adapter 22 may identify a region (e.g., VNIC QP region 33, VNIC MR region 36) in local memory (e.g., QP table 32, MR table 35, respectively) for managing the requested RDMA resources and reserved for VNIC 27. VIC adapter 22 may map the region (e.g., VNIC QP region 33, VNIC MR region 36) to the host memory (e.g., host QP region 34 and host MR region 37) as part of a base address register (BAR) address space exposed to host 30.

In a general sense, PCIe technology uses PCI configuration space to configure network interface cards inserted into the PCIe bus. To address a PCI device, such as a network interface card or integrated circuit (IC), the device must be mapped into an I/O port address space or the memory-mapped address space of the host (e.g., host 30). BARs can be used to hold memory addresses used by the device. Each BAR describes a region of memory. The BARs are programmed appropriately to inform the device of its address mapping by writing configuration commands to the PCI controller. The basic input/output system (BIOS) or the operating system (OS) of the device programs the memory-mapped and I/O port addresses into the device's BAR configuration register. The addresses remain valid as long as the device stays turned on.

Turning back to communication system 10, VIC adapter 22 may allow host 30 to access only mapped host QP region 34 and host MR region 37 reserved for VNIC 27 (e.g., by mapping a precise size). An error may be generated if host 30 attempts to access another region outside the mapped region. The RDMA engine on VIC host driver 26 at host 30 may read the BAR to discover the requested RDMA resources allocated to VNIC 27. For example, VIC host driver 26 (through the RDMA engine) may read the host address corresponding to host QP region 34 where VNIC QP region 33 of QP table 32 is mapped, and the host address corresponding to host MR region 37 where VNIC MR region 36 of MR table 35 is mapped.

During execution (e.g., run time, operation, etc.), VIC host driver 26 may service a request (e.g., from application 28) to create run-time RDMA resource (e.g., QP and MR used by application 28 for a specific communication session over the network). VIC host driver 26 may create the run-time RDMA resources in host memory for facilitating communication through the network interface endpoint. In an example embodiment, VIC host driver 26 may select a portion of the mapped region (e.g., host QP region 34 and host MR region 37) and allocating the portion to the run-time RDMA resources. VIC host driver 26 may determine a location of the portion selected for the run-time RDMA resources in VIC adapter 22's local memory (e.g., in VNIC QP region 33 and VNIC MR region 36). VIC host driver 26 may write (e.g., perform a programmed input/output (PIO) write operation) to the location in the local memory of VIC adapter 22 to update data about the QP or MR in the corresponding host memory. VIC host driver 26 may also mark validity of the run-time RDMA resources by marking a flag in the location in the allocated region in the VIC adapter's local memory (e.g., VNIC QP region 33 and VNIC MR region 36) corresponding to the portion in the host memory.

During traffic flow, a packet processor in VIC adapter 22 may extract an RDMA resource identifier (e.g., QP identifier, MR key, etc.) from an ingress packet. The packet processor uses the QP identifier to index into VNIC QP region 33, which is mapped to host 30. Before using the information stored for the QP, the packet processor checks the flag set by VIC host driver 26 to ensure that VNIC QP region 33 is valid. Thus, the packet processor references a RDMA resource (e.g., VNIC QP region 33) in VIC adapter 22's local memory to validate parameters. If the ingress RDMA request requires access to a MR, the packet processor uses the MR key in the RDMA packet to index into appropriate MR table 35. The packet processor validates the RDMA request (read/write) based on the access permissions specified for the particular VNIC MR region 36.

In some embodiments, user 12 may specify the RDMA resource information as part of a VNIC policy and associate the VNIC policy with network profile 16 used to provision a server. Management application 18 may generate RDMA policy 14 including the QP and MR information associated with network profile 16. Management application 18 may validate the RDMA resource information, for example, determining whether there are sufficient RDMA resources available to satisfy the requirements specified in network profile 16. Management application 18 may send the RDMA information to VIC adapter 22 as part of a VNIC configuration. VIC adapter 22 may allocate memory space in adapter memory to store QP table 32 and MR table 35.

VIC adapter 22 may also create VNIC 27, identify regions in host 30's local memory tables and map the regions to host 30 via BAR addresses. VIC host driver 26, managing VNIC 27, may discover the number of QPs and MRs allocated for VNIC 27 and may map the tables to its local memory (e.g., host QP region 34 and host MR region 37). By exposing the adapter memory directly to VIC host driver 26, QP and MR information can be updated without interrupting the VIC adapter firmware. By the time the VIC adapter's packet processor receives RDMA packets, the relevant RDMA resource information may be already present in adapter memory ready to be consumed.

Turning to the infrastructure of communication system 10, the network elements may communicate in any suitable network topology, which can include any number of servers, hardware accelerators, virtual machines, switches and routers, and other nodes inter-connected to form a large and complex network. A node may be any electronic device, client, server, peer, service, application, or other object capable of sending, receiving, or forwarding information over communications channels in a network. The various nodes may be coupled to other nodes through one or more interfaces employing any suitable network connection, which provides a viable pathway for electronic communications. Additionally, any one or more of these elements may be combined or removed from the architecture based on particular configuration needs.

Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The example network environment may be configured over a physical infrastructure that may include one or more networks and, further, may be configured in any form including, but not limited to, local area networks (LANs), wireless local area networks (WLANs), cellular networks, virtual local area networks (VLANs), metropolitan area networks (MANs), wide area networks (WANs), Intranet, Extranet, any other appropriate architecture or system, or any combination thereof that facilitates communications in a network. In some embodiments, a communication link may represent any electronic link supporting a wireless environment such as, for example, wireless technologies (e.g., IEEE 802.11x). In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, management application 18 comprises an application executing in a suitable network element, such as a fabric interconnect, or switch in the network in communication system 10. As used herein, the term "network element" is meant to encompass computers, network appliances, fabric interconnect, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. An example management application 18 is Cisco® Unified Computing System Manager (UCSM).

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration.

Figure 2:
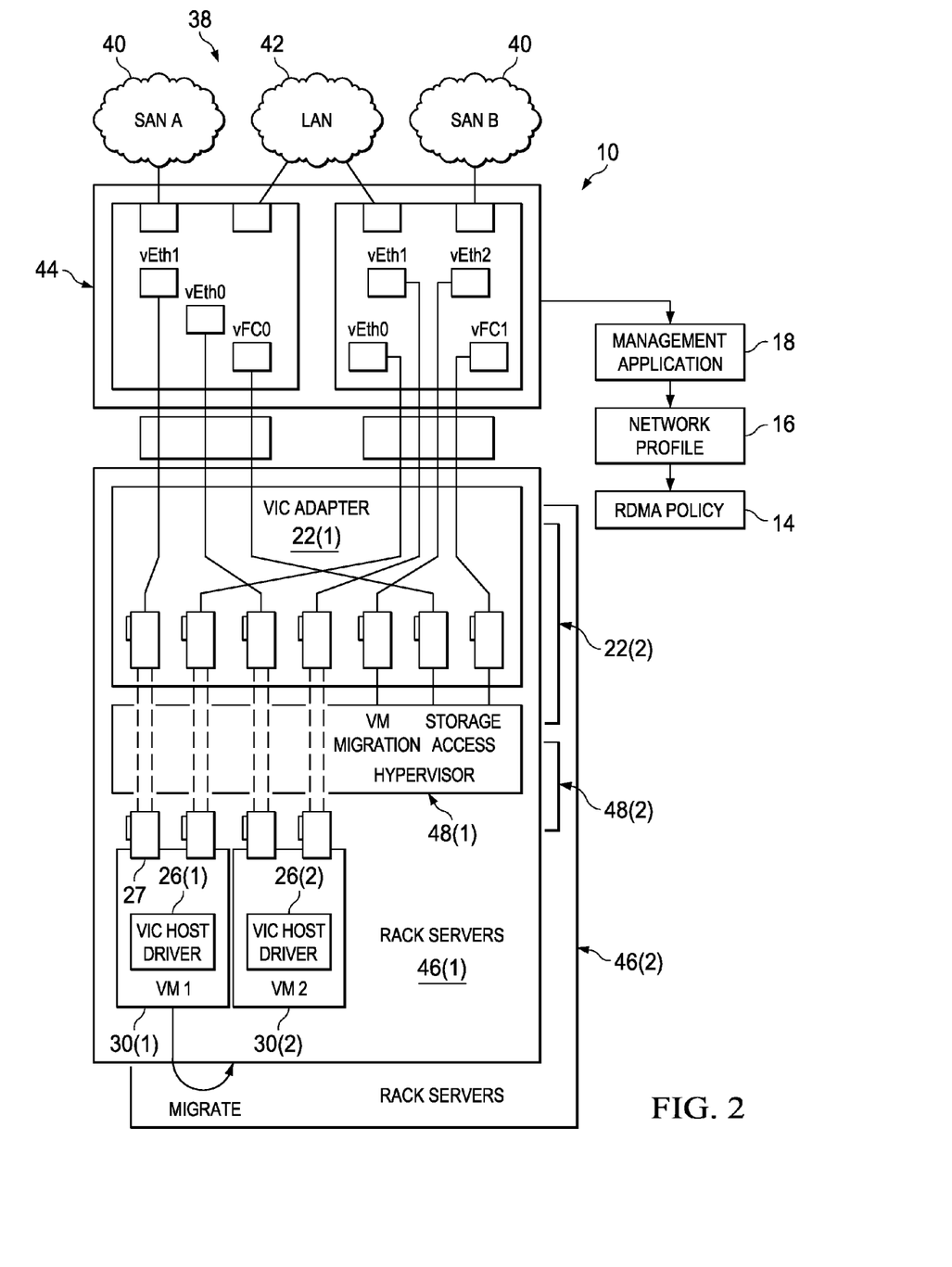
FIG. 2 is a simplified block diagram illustrating example details of an embodiment of the communication system.

Turning to FIG. 2, FIG. 2 is a simplified block diagram illustrating example details of an embodiment of communication system 10. Communication system 10 includes a network 38 comprising a storage area network (SAN) 40 (e.g., SAN A, SAN B) and a local area network (LAN) 42. Network 38 includes a fabric interconnect 44, which may be coupled to management application 18. In some embodiments, management application 18 may execute in fabric interconnect 44; in other embodiments, management application 18 may execute in another network element coupled to, and communicable with, fabric interconnect 44. Management application 14 may manage network profile 16, which may incorporate RDMA policy 14.

In various embodiments, fabric interconnect 44 may communicate with VIC adapters 22(1) and 22(2) provisioned in rack servers (or blade servers) 46(1) and 46(2), respectively. Rack server 46(1) may include one or more VMs (e.g., 30(1)-30(2)) that operate through a hypervisor 48(1). Rack server 46(2) may include a separate hypervisor 48(2) for instantiating its separate VMs. Each VM 30(1) and 30(2) may include respective VIC host drivers (e.g., 26(1), 26(2), respectively). In the example illustrated herein, VM 30(1) may include VNIC 27, used by a specific application (not shown) executing in VM 30(1). Note that communication system 10 may include any number of rack servers, VIC adapters, VMs, VNICs, etc. within the broad scope of the embodiments. The limited number of elements shown in the figure is merely for ease of illustration, and is not a limitation of communication system 10.

In various embodiments, management application 18 may maintain a group of policies (including RDMA policy 14) for a given VM-NIC (e.g., VNIC 27) as a particular one of network profile 16. When a specific VM 30(1) is powered on, hypervisor 48(1) instantiates VNIC 27, and associates instantiated VNIC 27 with the particular one of network profile 16 specified for VNIC 27. VIC host driver 26(1) passes an instantiation information (e.g., the network profile information, news about the instantiation, etc.) to VIC adapter 22(1), which in turn passes the instantiation information to management application 18 at upstream fabric interconnect 44. Management application 18 may identify the RDMA resources associated with particular network profile 16 and send the information to VIC adapter 22(1). VIC adapter 22(1) may map the configured RDMA resource as part of the VNIC BAR resources. VIC host driver 26(1) executing in VM 30(1) may discover the RDMA resources and use them accordingly. Because RDMA policy 14 is associated with network profile 16, when VM 30(1) migrates from server 46(1) to another server 46(2), RDMA policy 14 also migrates with VM 30(1). Another VIC adapter 22(2) may map the same set of RDMA resources as before to specific VNIC 27 (which moves with VM 30(1) to server 46(2)) after the migration.

Figure 3:
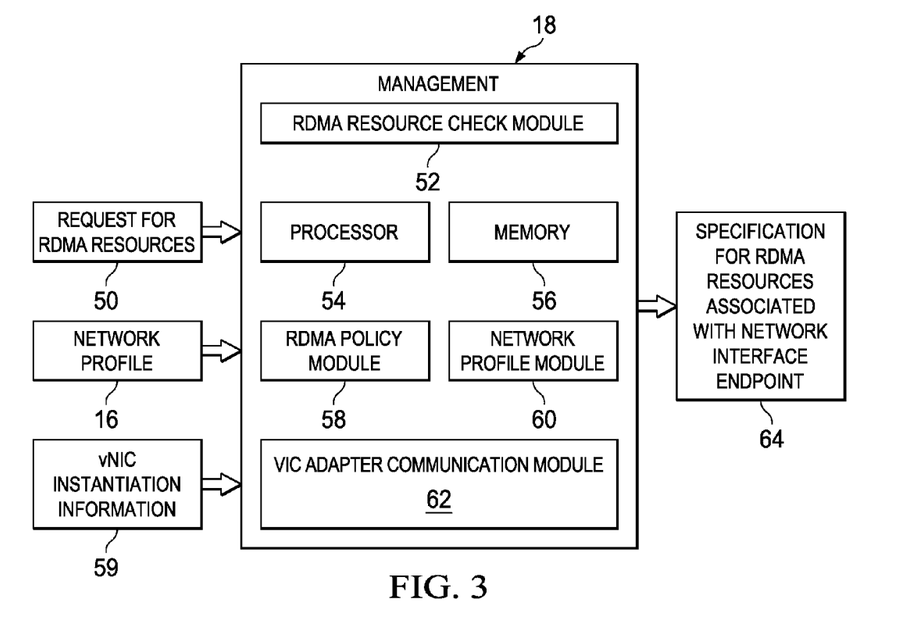
FIG. 3 is a simplified block diagram illustrating other example details of an embodiment of the communication system.

Turning to FIG. 3, FIG. 3 is a simplified block diagram illustrating example details according to an embodiment of communication system 10. Management application 18 may receive a request 50 for RDMA resources. A RDMA resource check module 52 may determine whether there are sufficient RDMA resources in the network to satisfy request 50. A processor 54 and a memory element 56 may facilitate various operations of management application 18. In some embodiments, an RDMA policy module 58 may insert request 50 for RDMA resources in RDMA policy 14. In some embodiments, management application 18 may receive network profile 16 (e.g., from user 12). In some embodiments, management application 18 may receive a VNIC instantiation information 59 (e.g., comprising news about instantiation of a specific VNIC according to a particular network profile).

A network profile module 60 may insert the RDMA policy 14 into network profile 16. In some embodiments, network profile module 60 may parse VNIC instantiation information 59, and associate a specific RDMA policy 14 with network profile 16 corresponding to the instantiated VNIC. A VIC adapter communication module 62 may facilitate communicating to VIC adapter 22 the requested RDMA resource information as a specification 64 for RDMA resources associated with a specific network interface endpoint (e.g., instantiated VNIC, or other network interface endpoint). In some embodiments, specification 64 may be included as part of a VNIC configuration.

Figure 4:
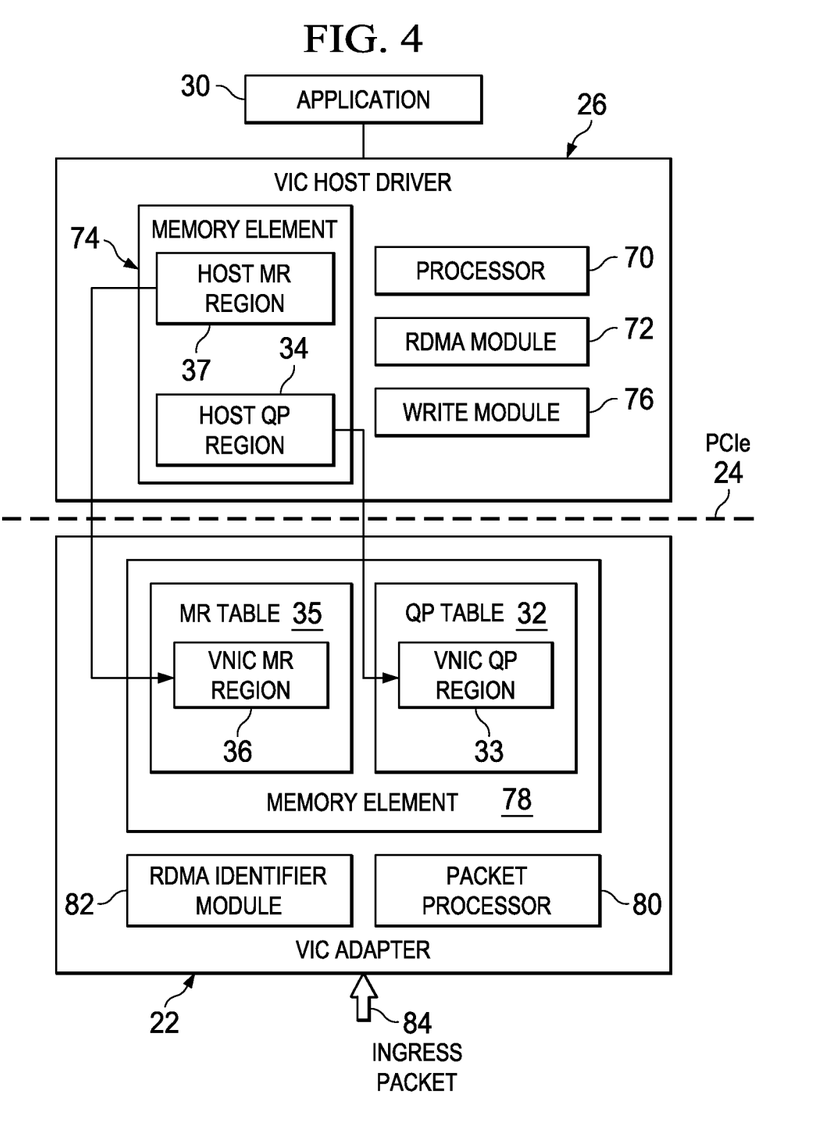
FIG. 4 is a simplified block diagram illustrating yet other example details of an embodiment of the communication system.

Turning to FIG. 4, FIG. 4 is a simplified block diagram illustrating example details according to an embodiment of communication system 10. VIC host driver 26 may include a processor 70, an RDMA module 72, a memory element 74 and a write module 76 (among other components and modules). Memory element 74 may comprise a portion of the host memory, associated with host 30. In various embodiments, application 28 may create a QP and/or an MR. RDMA module 72 may obtain a free QP identifier (ID) and update host QP region 34 in memory element 74. Write module 76 may update (e.g., through PIO write operation) VNIC QP region 33 in QP table 32 in VIC adapter 22's local memory element 78. RDMA module 72 may obtain a free MR ID (e.g., MR key) and update host MR region 37 in memory element 74. Write module 76 may update (e.g., through PIO write operation) VNIC MR region 36 in MR table 35 in VIC adapter 22.

During RDMA traffic flow, a packet processor 80 in VIC adapter 22 may extract the QP ID from ingress packet 84. An RDMA identifier module 82 may index into QP table 32 to get the updated data located therein. Packet processor 80 may also extract (if needed) the MR key from ingress packet 84. RDMA identifier module 82 may index into MR table 35 to get DMA address and access permissions according to the updated data located therein.

Figure 5:
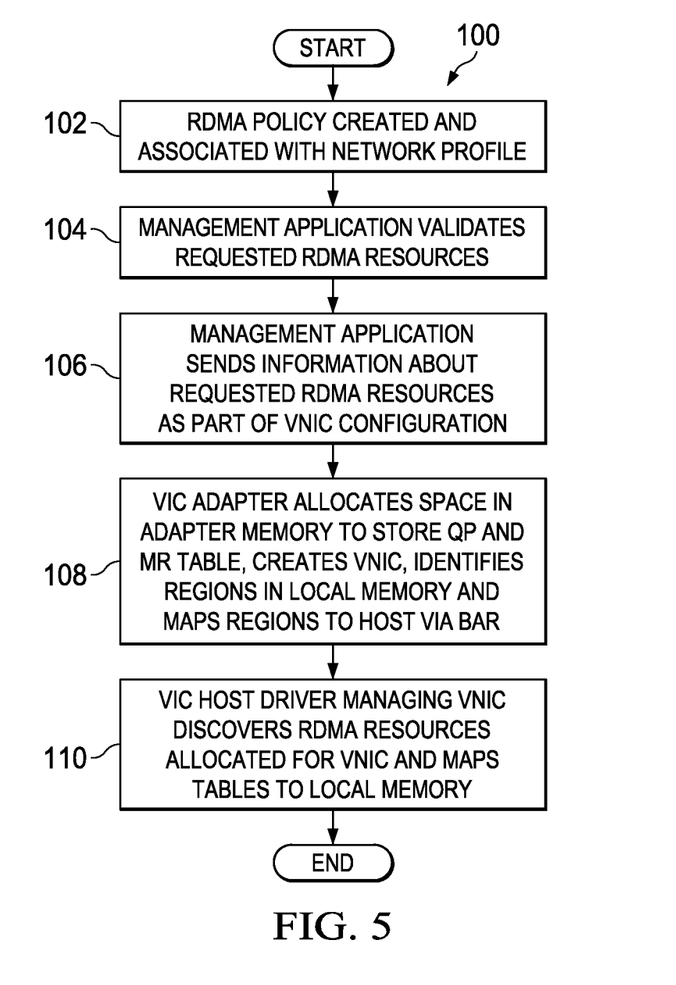
FIG. 5 is a simplified flow diagram illustrating example operations that may be associated with an embodiment of the communication system.

Turning to FIG. 5, FIG. 5 is a simplified flow diagram illustrating example operations 100 that may be associated with an embodiment of communication system 10. At 102, RDMA policy 14 (including RDMA resource request) may be created and associated with network profile 16. At 104, management application 18 may validate the requested RDMA resources. For example, management application 18 may determine whether sufficient RDMA resources are available to satisfy the request for RDMA resources. At 106, management application 18 may send information about the requested RDMA resources to VIC adapter 22 as part of a VNIC configuration. At 108, VIC adapter 22 allocates space in local memory element 78 to store QP table 32 and MR table 35. VIC adapter 22 may also create VNIC 27, and identify regions (e.g., VNIC QP region 33, VNIC MR region 36) in local memory element 78, and maps the regions to host 30 via BAR. At 110, VIC host driver 26 managing VNIC 27 may discover the RDMA resources and map the memory tables to local memory.

Figure 6:
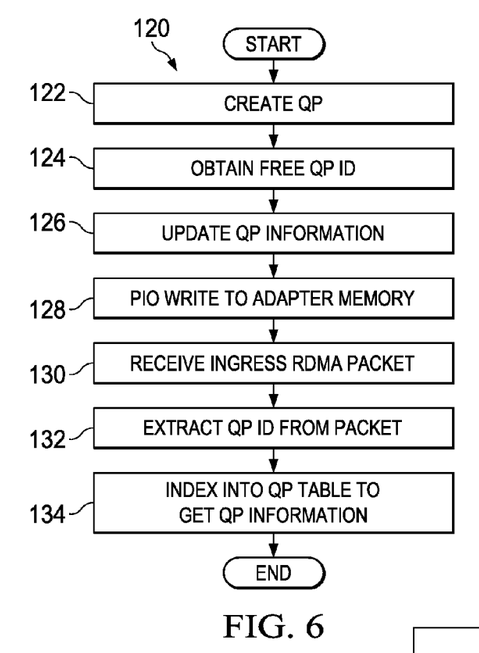
FIG. 6 is a simplified flow diagram illustrating other example operations that may be associated with an embodiment of the communication system.

Turning to FIG. 6, FIG. 6 is a simplified flow diagram illustrating example operations 120 that may be associated with an embodiment of communication system 10. At 122, a QP may be created (e.g., by application 28). At 124, VIC host driver 26 may obtain a free QP ID. At 126, VIC host driver 26 may update a QP information (info) in local memory element 74. At 128, VIC host driver 26 may write the updated QP info to VIC adapter memory element 78 in the appropriate memory region (e.g., VNIC QP region 33). At 130, VIC adapter 22 may receive ingress RDMA packet

84. At 132, VIC adapter 22 may extract a QP ID from packet 84. At 134, VIC adapter 22 may index into QP table 32 to get updated QP info.

Figure 7:
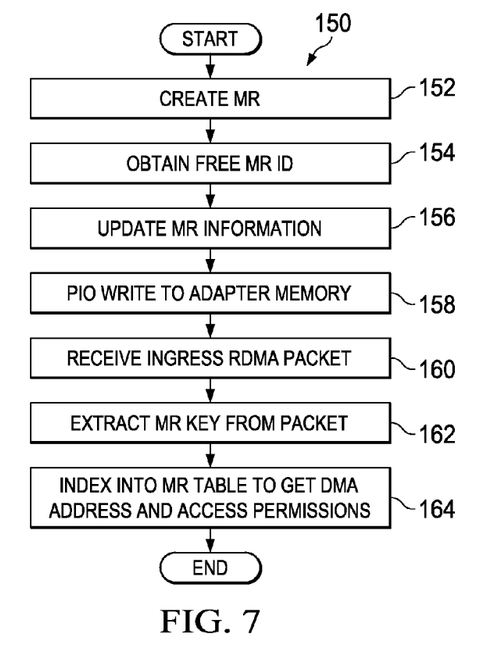
FIG. 7 is a simplified flow diagram illustrating other example operations that may be associated with an embodiment of the communication system.

Turning to FIG. 7, FIG. 7 is a simplified flow diagram illustrating example operations 150 that may be associated with an embodiment of communication system 10. At 152, a MR may be created (e.g., by application 28). At 154, VIC host driver 26 may obtain a free MR ID. At 156, VIC host driver 26 may update a MR info in local memory element 74. At 158, VIC host driver 26 may write the updated MR info to VIC adapter memory element 78 in the appropriate memory region (e.g., VNIC MR region 36). At 160, VIC adapter 22 may receive ingress RDMA packet 84. At 162, VIC adapter 22 may extract a MR key from packet 84. At 164, VIC adapter 22 may index into MR table 35 to get updated DMA address and access permissions.

Figure 8A:
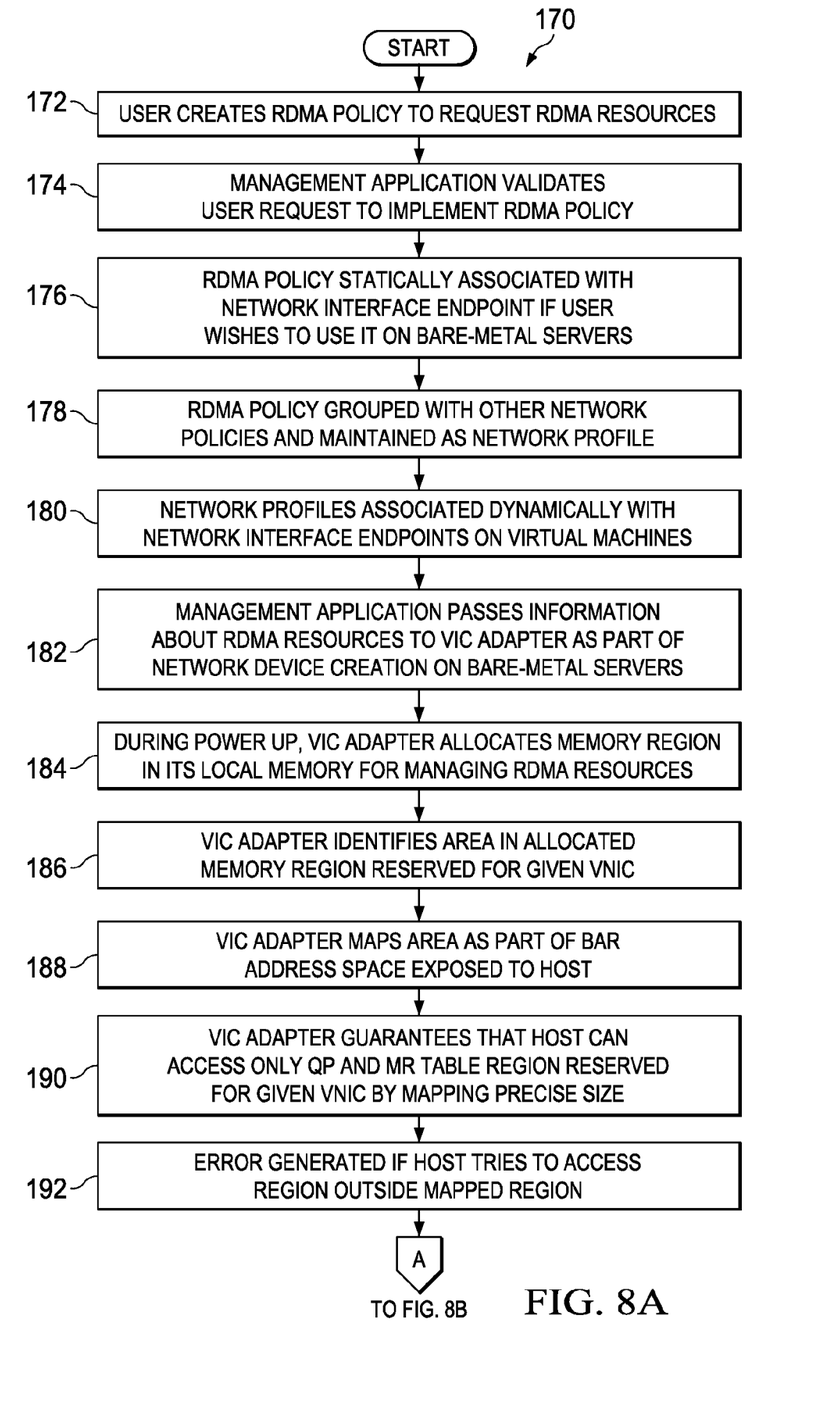
FIGS. 8A and 8B are simplified flow diagrams illustrating yet other example operations that may be associated with an embodiment of the communication system.
Figure 8B:
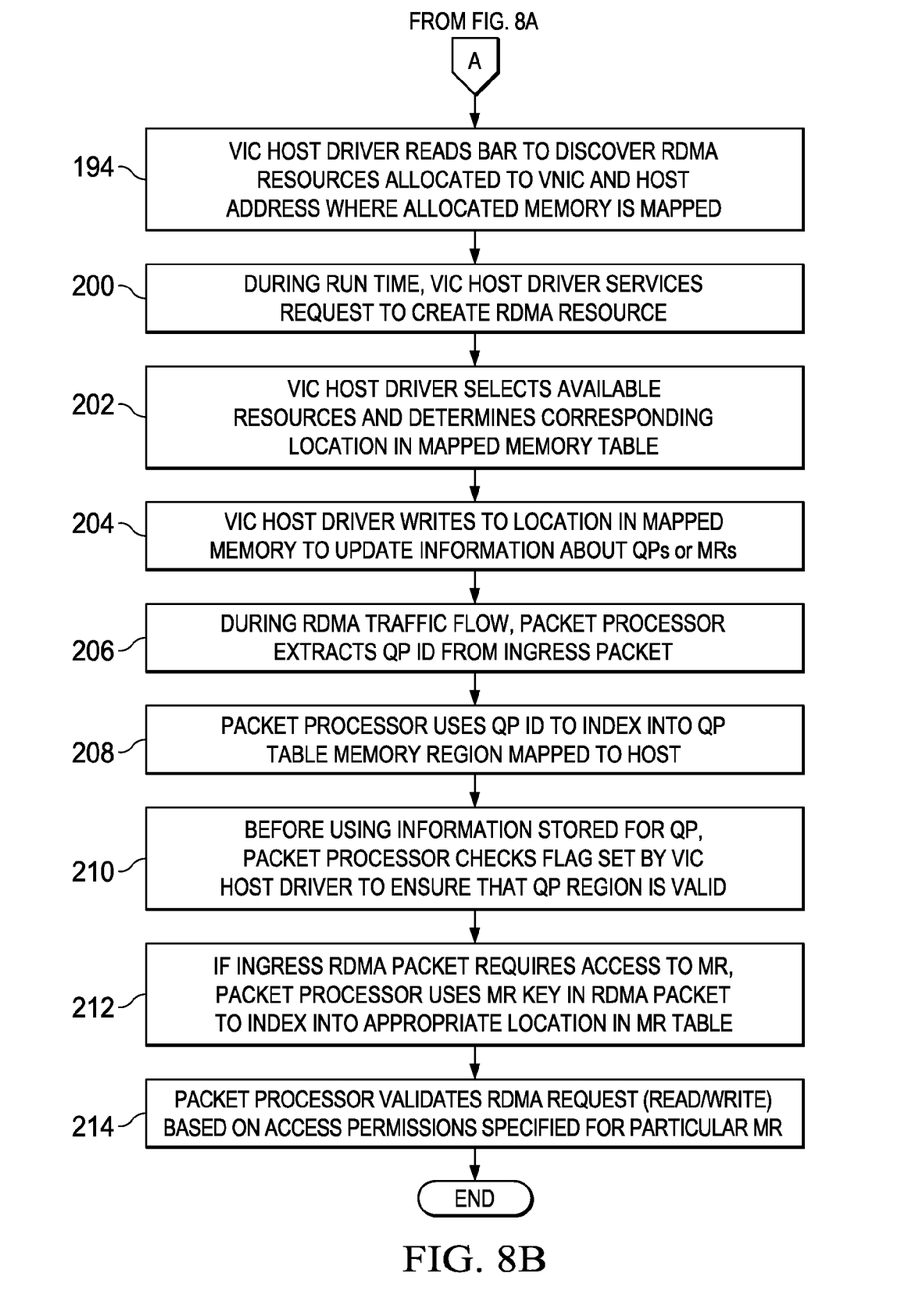

Turning to FIGS. 8A and 8B, FIGS. 8A and 8B are simplified flow diagrams illustrating example operations 170 that may be associated with an embodiment of communication system 10. At 172, user 12 may create RDMA policy 14 to request RDMA resources. For example, a specific number of desired QPs and MRs may be specified in RDMA policy 14. At 174, management application 18 may validate the user request to implement RDMA policy 14. At 176, RDMA policy 14 may be statically associated with a network interface endpoint (e.g., VNIC 27) if user 12 wishes to use it on bare metal servers. At 178, RDMA policy 14 may be grouped with other network policies and maintained as network profile 16. At 180, management application 18 may dynamically associate a plurality of network profile 16 with network interface endpoints on virtual machines. At 182, management application 18 may pass information about the requested RDMA resources to VIC adapter 22 (e.g., as part of network device creation on bare metal servers).

At 184, during power up, VIC adapter 22 may allocate memory region (QP table 32, MR table 35) its local memory for managing the requested RDMA resources. At 186, VIC adapter 22 may identify area (e.g., VNIC QP region 33 and VNIC MR region 36) in allocated memory region reserved for a given VNIC 27. At 188, VIC adapter 22 may map the area to host memory (e.g., in VIC host driver 26) as part of BAR address space exposed to host 30. At 190, VIC adapter 22 may guarantee that host 30 can access only the QP and MR table region reserved for VNIC 27 by mapping a precise size. At 192, an error may be generated if host 30 tries to access region outside the mapped region.

At 194, VIC host driver 26 may read the BAR address space to discover the RDMA resources allocated to VNIC 27 and host address where the allocated memory is mapped. At 200, during run time, VIC host driver 26 may service request (e.g., from application 28) to create RDMA resource. At 202, VIC host driver 26 may select available resources and determine the corresponding locations in the mapped memory tables. At 204, VIC host driver 26 may write to the location in mapped memory to update information about QPs or MRs.

At 206, during RDMA traffic flow, packet processor 80 in VIC adapter 22 may extract a QP ID from ingress packet 84. At 208, packet processor 80 may use the QP ID to index into QP table memory region (e.g., VNIC QP region 33) mapped to host 30. At 210, before using information stored for the QP, packet processor 80 may check a flag set by VIC host driver 26 to ensure that the QP region is valid. At 212, if ingress RDMA packet 84 requires access to MR, packet processor 80 may use an MR key in RDMA packet 84 to index into the appropriate location (e.g., VNIC MR region 36) in MR table 35. At 214, packet processor 80 may validate RDMA request (e.g., read/write) in RDMA packet 84 based on access permissions specified for the particular MR. Thus, packet processor 80 in the egress path may reference to VNIC QP region 33 in adapter memory to validate parameters.

Figure 9:
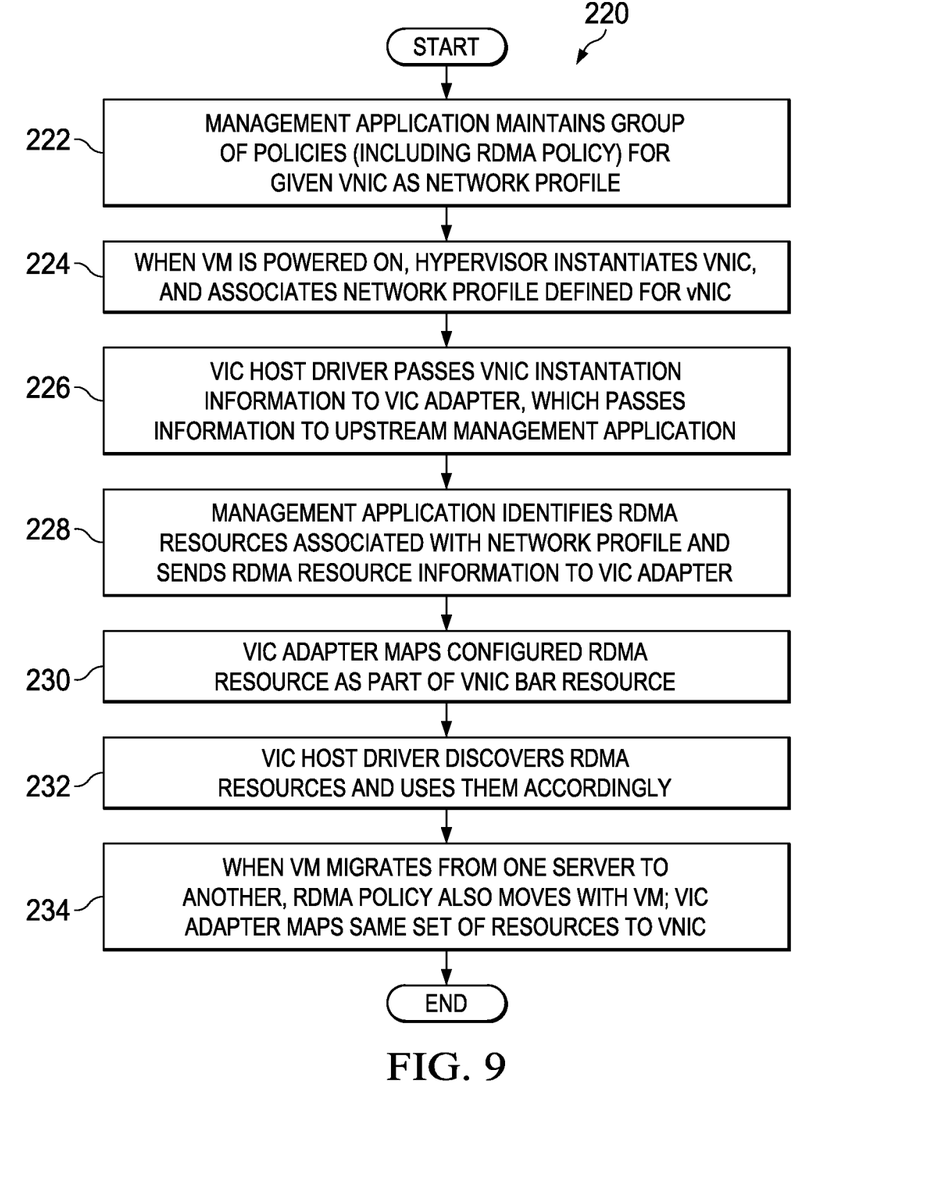
FIG. 9 is a simplified flow diagram illustrating yet other example operations that may be associated with an embodiment of the communication system.

Turning to FIG. 9, FIG. 9 is a simplified flow diagram illustrating example operations 220 that may be associated with embodiments of communication system 10. At 222, management application 18 may maintain a group of policies (including RDMA policy 14) for a given VNIC 27 as network profile 16. At 224, when VM 30(1) is powered on, hypervisor 48(1) instantiates VNIC 27 and associates network profile 16 defined for VNIC 27. At 226, VIC host driver 26(1) may pass VNIC instantiation information 59 (including network profile information) to VIC adapter 22(1), which forwards it to upstream management application 18. At 228, management application 18 may identify RDMA resources associated with network profile 16 and send the RDMA resource information to VIC adapter 22(1). At 230, VIC adapter 22(1) may map the configured RDMA resource as a part of VNIC BAR resource. At 232, VIC host driver 26(1) may discover the RDMA resources and use them accordingly. At 234, when VM 30(1) migrates from one server 46(1) to another server 46(2), RDMA policy 14 may also move with VM 30(1); VIC adapter 22(2) may map the same of RDMA resources to VNIC 27, which moves with VM 30(1).

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, VIC adapter 22 and VIC host driver 26. In some embodiments, one or more of these features may be implemented in hardware, provided external to these elements, or consolidated in any appropriate manner to achieve the intended functionality. The various network elements (e.g., VIC adapter 22 and VIC host driver 26) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 56, 74, 78) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processors 54, 70, packet processor 80) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   determining, by a management application in a network environment, whether sufficient remote direct memory access (RDMA) resources are available in the network environment to satisfy a request for RDMA resources;
   specifying, by the management application, the requested RDMA resources in a network profile of a workload, the network profile comprising a software definition of the workload, including placement, network connectivity, instances of application deployment, port configuration and server configuration of the workload;
   associating the network profile with a network interface endpoint of the workload executing on a host in the network, the host being separate from the management application in the network; and
   communicating the network profile by the management application over a control plane across the network to a virtual interface card (VIC) adapter that processes RDMA packets of the workload executing on the host, wherein the VIC adapter configures the requested RDMA resources in the VIC adapter's hardware, wherein the requested RDMA resources are mapped to a host memory for use by the network interface endpoint.

2. The method of claim 1, wherein the VIC adapter allocates and identifies a region in local memory for managing the requested RDMA resources and reserved for the network interface endpoint.

3. The method of claim 2, wherein the VIC adapter maps the region to the host memory as part of a base address register (BAR) address space exposed to the host.

4. The method of claim 3, wherein the VIC adapter allows the host to access only the mapped region reserved for the network interface endpoint, wherein an error is generated if the host attempts to access another region outside the mapped region.

5. The method of claim 3, wherein a VIC host driver in the host reads the BAR to discover the requested RDMA resources allocated to the network interface endpoint.

6. The method of claim 3, wherein a VIC host driver creates run-time RDMA resources for facilitating communication through the network interface endpoint, wherein the VIC host driver selects a portion of the mapped region in the host memory and allocates the portion to the run-time RDMA resources, wherein the VIC host driver determines a location in the allocated region in the VIC adapter's local memory corresponding to the portion in the host memory, wherein the VIC host driver writes to the location in the allocated region in the VIC adapter's local memory to update data in the portion in the host memory.

7. The method of claim 6, wherein the VIC adapter extracts an RDMA resource identifier from an ingress packet during traffic flow, wherein the RDMA resource identifier is used to index into the location in the allocated region in VIC adapter's local memory, wherein a RDMA resource in the VIC adapter's local memory is referenced to validate parameters.

8. The method of claim 1, wherein the network profile is associated with the network interface endpoint during instantiation at the workload on the host, wherein a VIC host driver communicates an instantiation information to the VIC adapter, wherein the method further comprises receiving the instantiation information from the VIC adapter.

9. The method of claim 8, wherein an RDMA policy including the request for the RDMA resources migrates with the workload from the host to another host, wherein another VIC adapter maps the requested RDMA resources to the migrated workload's network interface endpoint.

10. The method of claim 1, further comprising generating an RDMA policy from another policy, which includes the request for the RDMA resources, wherein the RDMA policy is inserted into the network profile.

11. Non-transitory tangible media that includes instructions for execution, which when executed by a processor, is operable to perform operations comprising:
determining, by a management application in a network environment, whether sufficient remote direct memory access (RDMA) resources are available in the network environment to satisfy a request for RDMA resources;
specifying, by the management application, the requested RDMA resources in a network profile of a workload, the network profile comprising a software definition of the workload, including placement, network connectivity, instances of application deployment, port configuration and server configuration of the workload;
associating the network profile with a network interface endpoint of the workload executing on a host in the network, the host being separate from the management application in the network; and
communicating the network profile by the management application over a control plane across the network to a virtual interface card (VIC) adapter that processes RDMA packets of the workload executing on the host, wherein the VIC adapter configures the requested RDMA resources in the VIC adapter's hardware, wherein the requested RDMA resources are mapped to a host memory for use by the network interface endpoint.

12. The media of claim 11, wherein the VIC adapter allocates and identifies a region in local memory for managing the requested RDMA resources and reserved for the network interface endpoint.

13. The media of claim 12, wherein the VIC adapter maps the region to the host memory as part of a BAR address space exposed to the host.

14. The media of claim 11, wherein the network profile is associated with the network interface endpoint during instantiation at the workload on the host, wherein a VIC host driver communicates an instantiation information to the VIC adapter, wherein the operations further comprise receiving the instantiation information from the VIC adapter.

15. The media of claim 14, wherein an RDMA policy including the request for the RDMA resources migrates with the workload from the host to another host, wherein another VIC adapter maps the requested RDMA resources to the migrated workload's network interface endpoint.

16. An apparatus, comprising:
a memory element for storing data; and
a processor, wherein the processor executes instructions associated with the data, wherein the processor and the memory element cooperate, such that the apparatus is configured as a management application for:
determining whether sufficient remote direct memory access (RDMA) resources are available in a network environment to satisfy a request for RDMA resources;
specifying the requested RDMA resources in a network profile of a workload, the network profile comprising a software definition of the workload, including placement, network connectivity, instances of application deployment, port configuration and server configuration of the workload;
associating the network profile with a network interface endpoint of the workload executing on a host in the network, the host being separate from the management application in the network; and
communicating the network profile over a control plane across the network to a virtual interface card (VIC) adapter that processes RDMA packets of the workload executing on the host, wherein the VIC adapter configures the requested RDMA resources in the VIC adapter's hardware, wherein the requested RDMA resources are mapped to a host memory for use by the network interface endpoint.

17. The apparatus of claim 16, wherein the VIC adapter allocates and identifies a region in local memory for managing the requested RDMA resources and reserved for the network interface endpoint.

18. The apparatus of claim 17, wherein the VIC adapter maps the region to the host memory as part of a BAR address space exposed to the host.

19. The apparatus of claim 16, wherein the network profile is associated with the network interface endpoint during instantiation at the workload on the host, wherein a VIC host driver communicates an instantiation information to the VIC adapter, wherein the apparatus is further configured for receiving the instantiation information from the VIC adapter.

20. The apparatus of claim 19, wherein an RDMA policy including the request for the RDMA resources migrates with the workload from the host to another host, wherein another VIC adapter maps the requested RDMA resources to the migrated workload's network interface endpoint.

* * * * *